United States Patent
Hawes (10) Patent No.: US 7,322,392 B2
(45) Date of Patent: Jan. 29, 2008

(54) TIRE PUMP

(75) Inventor: Kevin J. Hawes, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 170 days.

(21) Appl. No.: 11/155,429

(22) Filed: Jun. 17, 2005

(65) Prior Publication Data

US 2006/0283534 A1 Dec. 21, 2006

(51) Int. Cl.
*B60C 23/12* (2006.01)

(52) U.S. Cl. .................. 152/419; 152/418; 417/233

(58) Field of Classification Search ........... 152/415, 152/418, 419, 423, 424; 417/233, 279, 399
See application file for complete search history.

(56) References Cited

U.S. PATENT DOCUMENTS

| | | | | |
|---|---|---|---|---|
| 1,330,072 A | * | 2/1920 | Geddes | 152/418 |
| 1,875,874 A | * | 9/1932 | Johnson | 152/418 |
| 2,095,489 A | | 10/1937 | Cotton | |
| 3,219,272 A | * | 11/1965 | Korte | 236/93 R |
| 5,325,901 A | * | 7/1994 | Olney et al. | 152/418 |

FOREIGN PATENT DOCUMENTS

FR 906.319 12/1945

OTHER PUBLICATIONS

EP Search Report dated Sep. 25, 2006.

* cited by examiner

*Primary Examiner*—Russell D. Stormer
*Assistant Examiner*—Kip Kotter
(74) *Attorney, Agent, or Firm*—Jimmy L. Funke (57) ABSTRACT

A tire pump includes a passive air pump which is attachable to a component of a vehicle wheel assembly. The vehicle wheel assembly has a vehicle wheel, a tire valve stem attached to the vehicle wheel, and a tire mounted on the vehicle wheel and containing a gas. The passive air pump has an air inlet in direct fluid communication with the atmosphere and has an air outlet in direct fluid communication with the gas in the tire. The passive air pump is operable by transient pressure pulses of the gas in the tire to suck in an air volume from the atmosphere through the air inlet after a present one of the transient pressure pulses and to pump at least some of the sucked-in air volume through the air outlet into the tire during a future one of the transient pressure pulses.

2 Claims, 8 Drawing Sheets

TIRE PUMP

TECHNICAL FIELD

The present invention relates generally to tires, and more particularly to a tire pump.

BACKGROUND OF THE INVENTION

Vehicles include those having vehicle wheels, a tire valve stem attached to the vehicle wheel and containing a tire valve (such as a Schraeder valve), and a tubeless tire mounted on the vehicle wheel and containing a gas (such as air or nitrogen). Normal tires slowly leak gas over time and are periodically pressurized back to a desirable pressure by the vehicle operator or service personnel. Conventional tire pumps include those found at gas stations which use an air pump to compress air, an accumulator to hold the compressed air, and a hose with a valve to connect to the tire valve and pressurize the tire. Conventional tire pumps also include those found at certain tire stores which use a cylinder of compressed nitrogen and a hose with a valve to connect to the tire valve and pressurize the tire. Conventional tire pumps further include bicycle pumps which manually operate a piston to compress air and which have a hose with a valve to connect to the tire valve and pressurize the tire.

What is needed is an improved tire pump.

SUMMARY OF THE INVENTION

An expression of an embodiment of the invention is for a tire pump which includes a passive air pump which is attachable to a component of a vehicle wheel assembly. The vehicle wheel assembly has a vehicle wheel, a tire valve stem attached to the vehicle wheel, and a tire mounted on the vehicle wheel and containing a gas. The passive air pump has an air inlet in direct fluid communication with the atmosphere and has an air outlet in direct fluid communication with the gas in the tire. The passive air pump is operable by transient pressure pulses of the gas in the tire to suck in an air volume from the atmosphere through the air inlet after a present one of the transient pressure pulses and to pump at least some of the sucked-in air volume through the air outlet into the tire during a future one of the transient pressure pulses.

Several benefits and advantages are derived from the expression of an embodiment of the invention. The passive air pump remains attached to the component of the vehicle wheel assembly when the vehicle is moving and uses transient pressure pulses of the gas in the tire to operate the passive air pump. In one application, transient pressure pulses occur when the tire experiences rough road bumps and/or when the tire experiences handling maneuvers which cycle the vehicle's suspension. In one example, the passive air pump increases tire pressure to a desired level overcoming the normal tire gas leakage without any action taken by the vehicle operator or service personnel.

DETAILED DESCRIPTION

A first embodiment of a tire pump is shown in FIGS. 1-4. A first expression of the embodiment of FIGS. 1-4 is for a tire pump 10 including a passive air pump 12 attachable (and in one example attached) to a component of a vehicle wheel assembly 14 having a vehicle wheel 16, a tire valve stem 18 attached to the vehicle wheel 16, and a tire 20 mounted on the vehicle wheel 16 and containing a gas 22. The passive air pump 12 has an air inlet 24 in direct fluid communication with the atmosphere 26 and has an air outlet 28 in direct fluid communication with the gas 22 in the tire 20. The passive air pump 12 is operable by transient pressure pulses of the gas 22 in the fire 20 to suck in an air volume from the atmosphere 26 through the air inlet 24 after a present one of the transient pressure pulses and to pump at least some of the sucked-in air volume through the air outlet 28 into the tire 20 during a future one of the transient pressure pulses. By "direct fluid communication" is meant fluid communication without any intervening valve.

In one enablement of the first expression of the embodiment of FIGS. 1-4, the passive air pump 12 is a single stage passive air pump 13, and the future one of the transient pressure pulses is a next-in-time one of the transient pressure pulses to the present one of the transient pressure pulses. In the same or a different enablement, the passive air pump 12 is an external passive air pump disposable outside the tire 20 and threadably attachable to the tire valve stem 18 outside the tire.

In one arrangement of the first expression of the embodiment of FIGS. 1-4, the passive air pump 12 also includes a pressure relief valve 30 having an input port 32 in direct fluid communication with the gas 22 in the tire 20 and having an output port 34 in direct fluid communication with the atmosphere 26. In this arrangement, with the pressure relief valve 30 set at a desired cold-tire pressure, a warm tire returning to the cold-tire state would be under-inflated typically by 2-3 psi (pounds per square inch). In the same or a different arrangement, the tire pump 10 also includes a pressure sensor 36 having an input 38 in direct fluid communication with the gas 22 in the tire 20. In one variation, the pressure sensor 36 is used to monitor the operation of the tire pump 10 and/or to indicate an under-inflated tire needing operator attention.

A second expression of the embodiment of FIGS. 1-4 is for a tire pump 10 which includes a single-stage passive air pump 13 attachable (and in one example attached) to a tire valve stem 18 which is devoid of a tire valve and which is attached to a vehicle wheel 16 supporting a tire 20 containing a gas 22. The passive air pump 13 has an air inlet 24 in direct fluid communication with the atmosphere 26 and has an air outlet 28 in direct fluid communication with the gas 22 in the tire 20. The passive air pump 13 is operable by transient pressure pulses of the gas 22 in the tire 20 to suck in an air volume from the atmosphere through the air inlet 24 after a present one of the transient pressure pulses and to pump at least some of the sucked-in air volume through the air outlet 28 into the tire 20 during a next-in-time one of the transient pressure pulses to the present one of the transient pressure pulses. The passive air pump 13 includes first and second check valves 42 and 44 and includes a piston assembly 46 having a piston 48 and having a piston rod 50 attached to the piston 48 with the piston rod 50 having a free end 52.

In one construction of the second expression of the embodiment of FIGS. 1-4, the passive air pump 13 includes a gas path 54 containing air 56 and fluidly connecting together the air inlet 24 and the air outlet 28. The first check valve 42 is disposed in the gas path 54 toward the air inlet 28, and the second check valve 44 is disposed in the gas path 54 toward the air outlet 28. The free end 52 of the piston rod 50 is movable to compress and suction the air 56 in the gas path 54 between the first and second check valves 42 and 44, and the piston 48 is in direct fluid communication with the gas 22 in the tire 20.

In one deployment of the second expression of the embodiment of FIGS. 1-4, the passive air pump 13 also includes a tire valve 58 (such as a Schraeder valve). The tire valve 58 has a tire-filling inlet 60 in direct fluid communication with the atmosphere 26. The tire valve 58 has a tire-filling outlet 62 in direct fluid communication with the gas 22 in the fire 20.

In one implementation of the second expression of the embodiment of FIGS. 1-4, the passive air pump 13 also includes a temperature-responsive blocking device 40 (such as a bimetallic strip). The temperature-responsive blocking device 40 moves from a first location to a second location at warm-tire temperatures to prevent a transient pressure pulse from moving the piston 48. The temperature-responsive blocking device 40 moves back to the second location from the first location at cold-tire temperatures to allow a transient pressure pulse to move the piston 48. More broadly described, the temperature-responsive blocking device 40 is disposed wherein the temperature-responsive blocking device 40 blocks operation of the passive air pump 13 at warm-tire temperatures and allows operation of the passive air pump 13 at cold-tire temperatures. In one variation, not shown, the temperature-responsive blocking device blocks the opening of a check valve, blocks the air inlet 24, and/or blocks the air outlet 28. Other utilizations of the temperature-responsive blocking device to block operation of the passive air pump at warm-tire temperatures and to allow operation of the passive air pump at cold-tire temperatures are left to the artisan.

Figure 1:
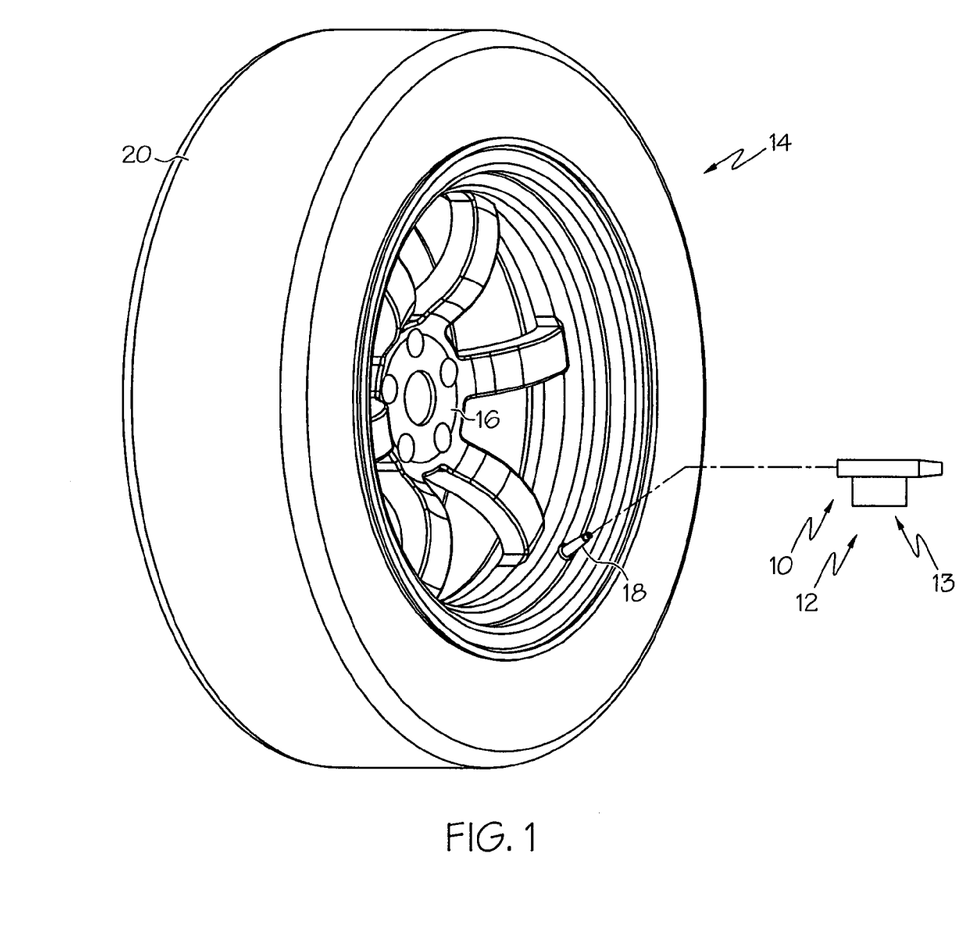
FIG. 1 is a schematic perspective view of an embodiment of a vehicle wheel, a tire valve stem, and a tire and a schematic side elevational view of a first embodiment of a tire pump about to be attached to the tire valve stem.
Figure 2:
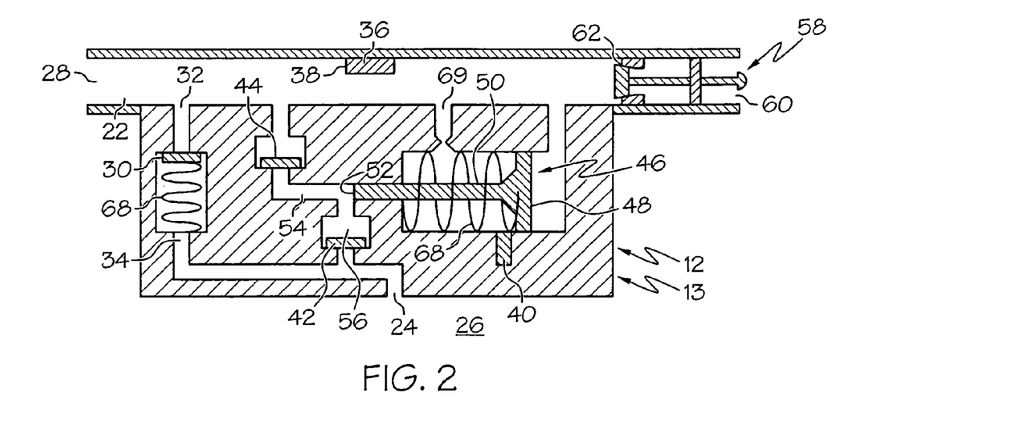
FIG. 2 is a schematic cross sectional view of the tire pump of FIG. 1 after attachment to the tire valve stem of FIG. 1, wherein the tire pump is shown at a time of steady state pressure of the gas in the tire.
Figure 3:
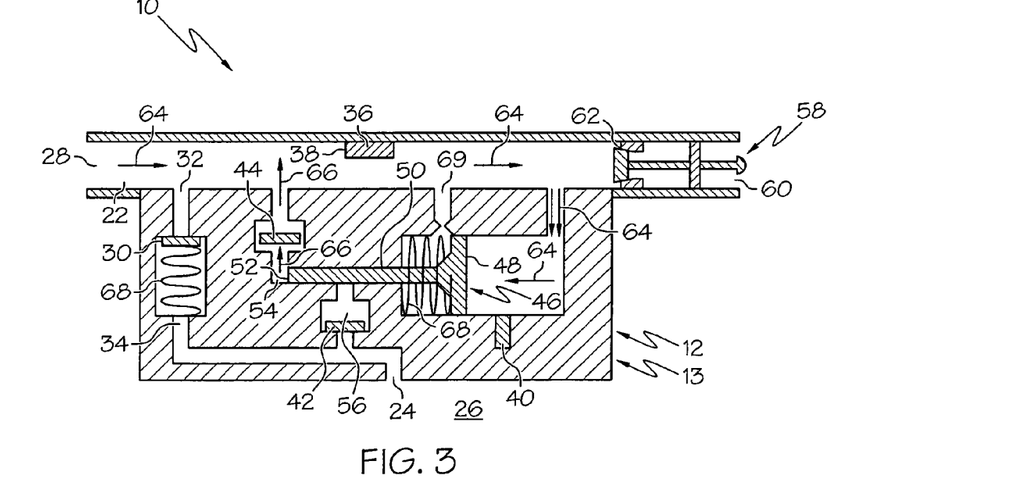
FIG. 3 is a view, as in FIG. 2, but with the tire pump shown at the height of a transient pressure pulse of the gas in the tire.

In operation, the first and second check valves 42 and 44 are closed during steady state pressure of the gas 22 in the tire 20, as shown in FIG. 2. In one design, the first and second check valves 42 and 44 include springs (not shown) to maintain a closed position during steady state tire pressure. The progression of a transient pressure pulse is shown in FIG. 3 by arrows 64 from after entering the air inlet 24 of the passive air pump 13 to moving the piston 48. This causes the free end 52 of the piston rod 50 to force some of the air volume in the gas path 54 between the first and second check valves 42 and 44 to exit the second check valve 44 (such exiting air indicated by arrow 66) and become in direct fluid communication with the gas 22 in the tire 20 thereby increasing the tire air content and subsequent pressure. The return of the piston 48 after the transient pressure pulse has subsided causes the withdrawing free end 52 of the piston rod 50 to create a suction in the gas path 54 between the first and second check valves 42 and 44 which closes the second check valve 44 and opens the first check valve 42 to take in an air volume (such entering air indicated by arrow 67) from the atmosphere 26. Return springs 68 are shown for the piston 48 and the pressure relief valve 30.

In one choice of materials for the second expression of the embodiment of FIGS. 1-4, the piston 48 consists essentially of a light metallic or consists essentially of a plastic composite wherein transient pressure pulses are able to cause movement of the piston 48. In one illustration, a pothole five inches deep produces a peak transient pressure pulse of 1.2 pounds per square inch (psi) in the tire 20 at twenty miles per hour (mph) and produces a peak transient pressure pulse of 1.6 psi at fifteen mph, such peak transient pressure pulses being sufficient to operate the passive air pump 12. In the same or a different illustration, rumble strips one inch high and thirty inches apart produce peak transient pressure pulses of 0.58 psi at eighteen mph, such transient pressure pulses being sufficient to operate the passive air pump 12. In one occurrence, the transient pressure pulse associated with the five inch deep pothole encountered by the tire 20 at fifteen mph builds up to the peak pressure and subsides back down in substantially 250 milliseconds.

Figure 4:
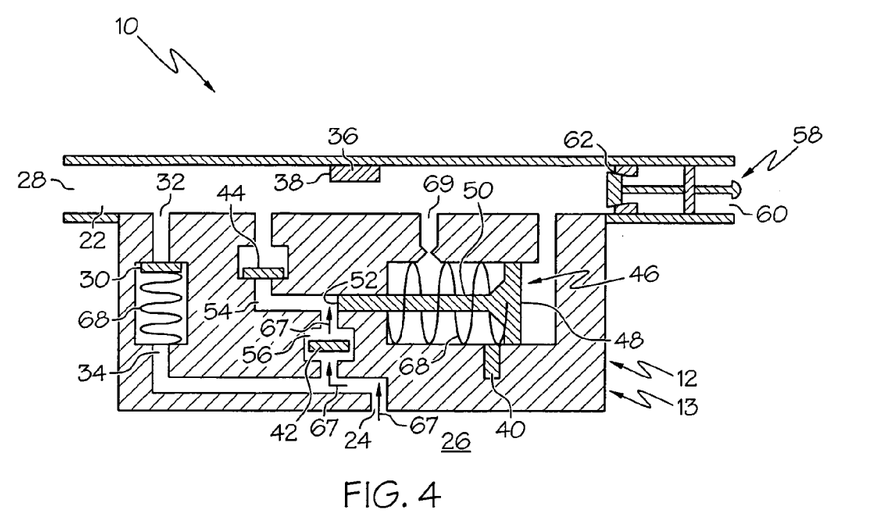
FIG. 4 is a view, as in FIG. 3, but with the tire pump shown recovering from the height of the transient pressure pulse experienced in FIG. 3.

In one design of the second expression of the embodiment of FIGS. 1-4, the piston 48 is oriented along the rotational path of the tire 20 to substantially avoid any pinning of the piston 48 in the radial direction from the tire axle caused by centripetal force, as can be appreciated by those skilled in the art. In the same or a different design, the passive air pump 12 also includes a throttle port 69 whose throat size is chosen to tune the passive air pump's response to a predetermined transient pressure pulse. The throttle port 69 also allows the piston 48 to return to its neutral position by releasing vacuum on the left side of the piston 48 (as seen in FIG. 4).

In an alternate first embodiment, the piston assembly 46 is replaced with a diaphragm (not shown). In the alternate first embodiment, the diaphragm would move to compress and suction the air 56 in the gas path 54 between the first and second check valves 42 and 44. In the alternate first embodiment, the diaphragm would be in direct fluid communication with the gas 22 in the tire 20.

Figure 5:
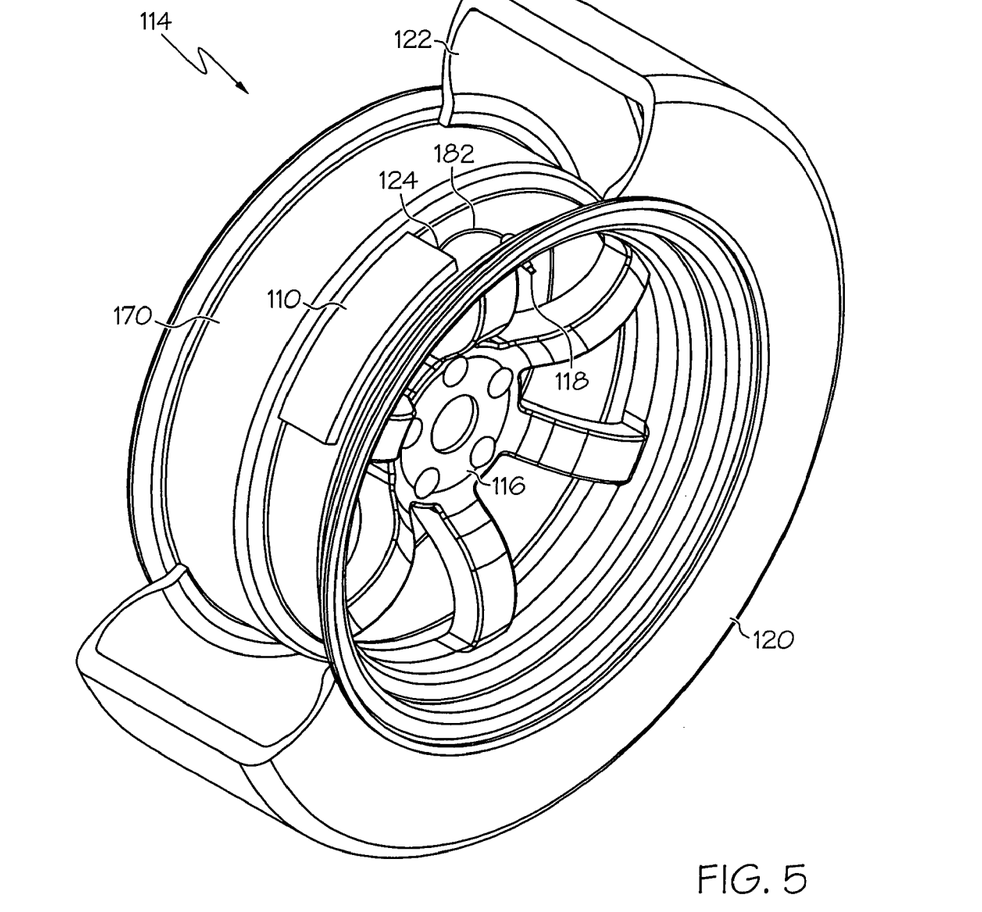
FIG. 5 is a schematic, partially cutaway, perspective view of an embodiment of a vehicle wheel, a tire valve stem, a tire, and a second embodiment of a tire pump attached to the rim of the vehicle wheel.
Figure 6:
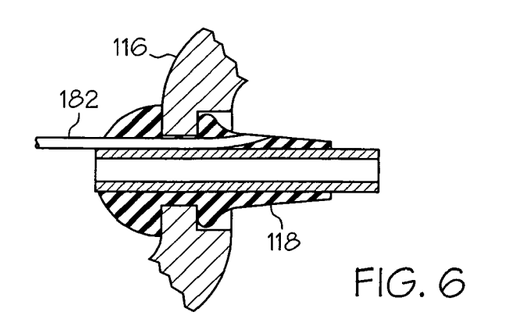
FIG. 6 is a cross sectional view of the tire valve stem of FIG. 5.
Figure 7:
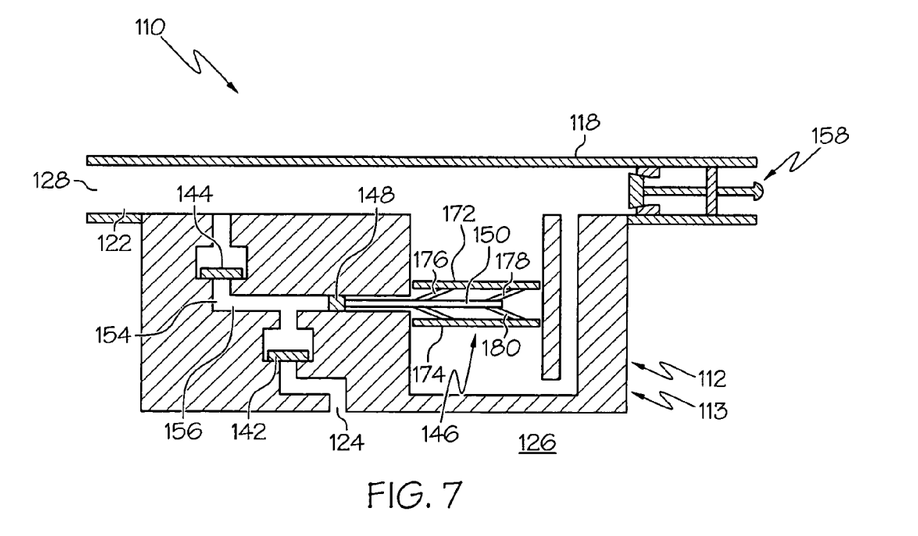
FIG. 7 is a schematic cross sectional view of the tire pump of FIG. 5.

A second embodiment of a tire pump is shown in FIGS. 5-7. A first expression of the embodiment FIGS. 5-7 is for a tire pump 110 which includes including a passive air pump 112 attachable (and in one example attached) to a component of a vehicle wheel assembly 114 having a vehicle wheel 116, a tire valve stem 118 attached to the vehicle wheel 116, and a fire 120 mounted on the vehicle wheel 116 and containing a gas 122. The passive air pump 112 has an air inlet 124 in direct fluid communication with the atmosphere 126 and has an air outlet 128 in direct fluid communication with the gas 122 in the tire 120. The passive air pump 112 is operable by transient pressure pulses of the gas 122 in the tire 120 to suck in an air volume from the atmosphere 126 through the air inlet 124 after a present one of the transient pressure pulses and to pump at least some of the sucked-in air volume through the air outlet 128 into the tire 120 during a future one of the transient pressure pulses.

Figure 8:
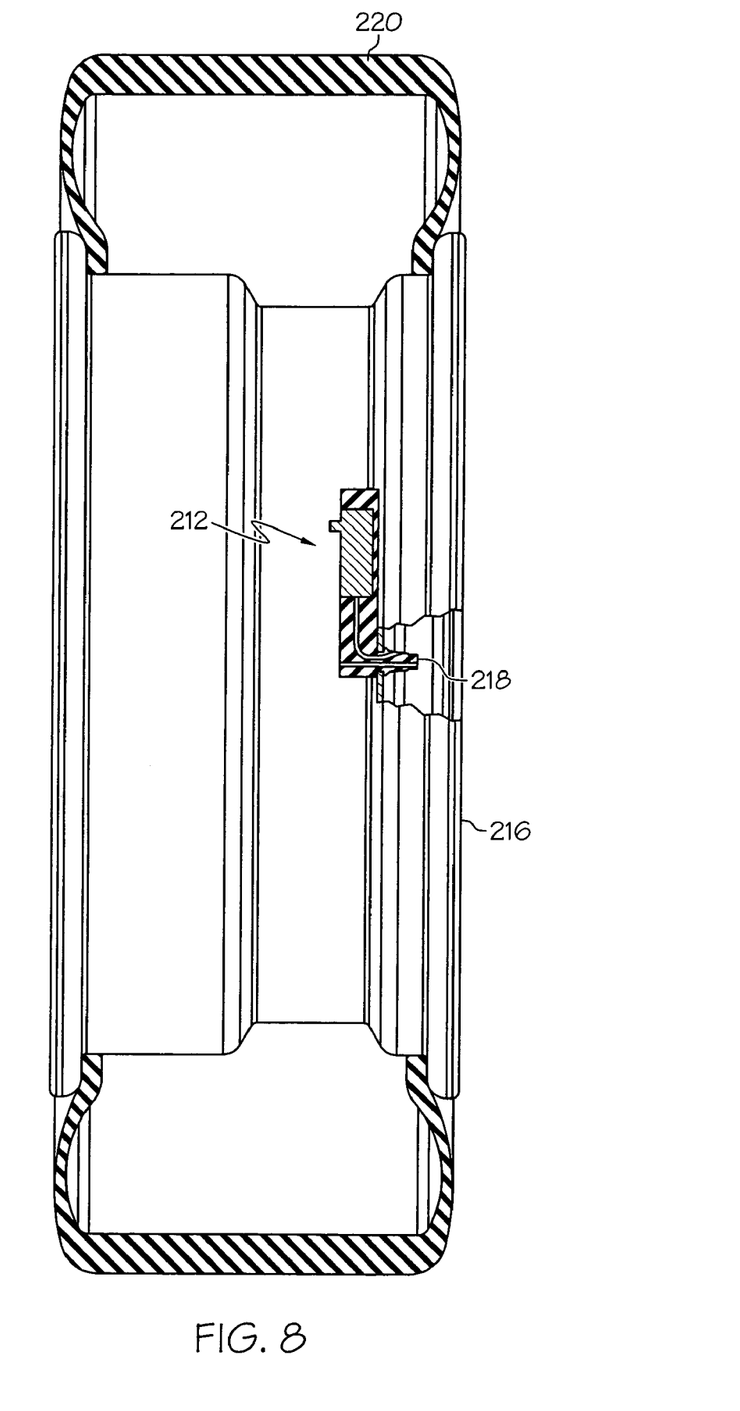
FIG. 8 is a schematic cross sectional view of an alternate second embodiment of a tire pump molded to a tire valve stem attached to a vehicle wheel.

In one enablement of the first expression of the embodiment of FIGS. 5-7, the vehicle wheel 116 includes a wheel rim 170, and the passive air pump 112 is an internal passive air pump disposable inside the tire 120 and attachable to the wheel rim 170. In an alternate second embodiment shown in FIG. 8, the passive gas pump 212 is an internal passive gas pump disposable inside the tire 220 and molded to the tire valve stem 218 which is attached to the vehicle wheel 216.

A second expression of the embodiment of FIGS. 5-7 is for a tire pump 110 which includes a single-stage passive air pump 113 attachable (and in one example attached) to a component of a vehicle wheel assembly 114 having a vehicle wheel 116, a tire valve stem 118 attached to the vehicle wheel 116, and a tire 120 mounted on the vehicle wheel 116 and containing a gas 122. The passive air pump 113 has an air inlet 124 in direct fluid communication with the atmosphere 126 and has an air outlet 128 in direct fluid communication with the gas 122 in the tire 120. The passive air pump 113 is operable by transient pressure pulses of the gas 122 in the tire 120 to suck in an air volume from the atmosphere 126 through the air inlet 124 after a present one of the transient pressure pulses and to pump at least some of the sucked-in air volume through the air outlet 128 into the tire 120 during a next-in-time one of the transient pressure pulses to the present one of the transient pressure pulses. The passive air pump 113 includes first and second check valves 142 and 144, first and second plates 172 and 174, and a piston assembly 146 disposed between the first and second plates 172 and 174.

In one enablement of the second expression of the embodiment of FIGS. 5-7, the piston assembly 146 includes a piston rod 150, a piston 148 attached to the piston rod 150, and at least one V-shaped spring 176 having a vertex attached to the piston rod 150, having a first spring arm 178 contacting the first plate 172, and having a second spring arm 180 contacting the second plate 174. The transient pressure pulses squeeze the first and second plates 172 and 174 to deflect the V-shaped spring 176 and longitudinally move the piston 148.

In one arrangement of the second expression of the embodiment of FIGS. 5-7, the passive air pump 113 includes a gas path 154 containing air 156 and fluidly connecting together the air inlet 124 and the air outlet 128. The first check valve 142 is disposed in the gas path 154 toward the air inlet 124, and the second check valve 144 is disposed in the gas path 154 toward the air outlet 128. The piston 148 when longitudinally moved forward compresses, and when longitudinally moved backward suctions, the air 156 in the gas path 154 between the first and second check valves 142 and 144.

In one construction of the second expression of the embodiment of FIGS. 5-7, the tire pump 110 also includes a tire valve stem 118 having an installed tire valve 158 and includes a direct conduit path 182 extending from the air inlet 124 of the passive air pump 113 to and through the tire valve stem 118 to outside the vehicle wheel 116 and the tire 120.

In an alternate second embodiment, not shown, the edges of the first and second plates are hermetically connected by a flexible (e.g., rubber) seal, and a balance hole in one of the plates equalizes pressure inside the plates to tire presssure, as can be appreciated by those skilled in the art.

Figure 9:
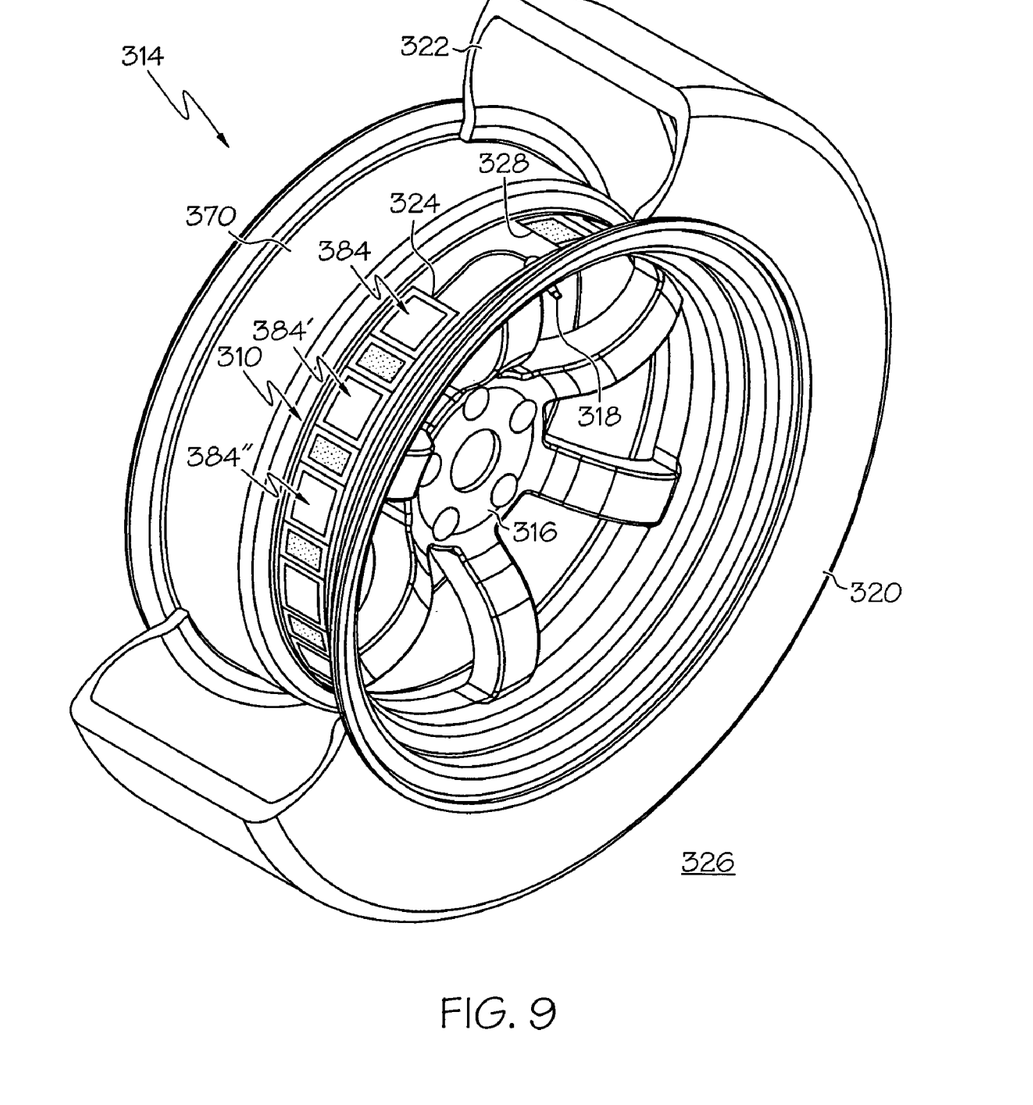
FIG. 9 is a schematic, partially cutaway, perspective view of an embodiment of a vehicle wheel, a tire valve stem, a tire, and a third embodiment of a tire pump attached to the rim of the vehicle wheel.
Figure 10:
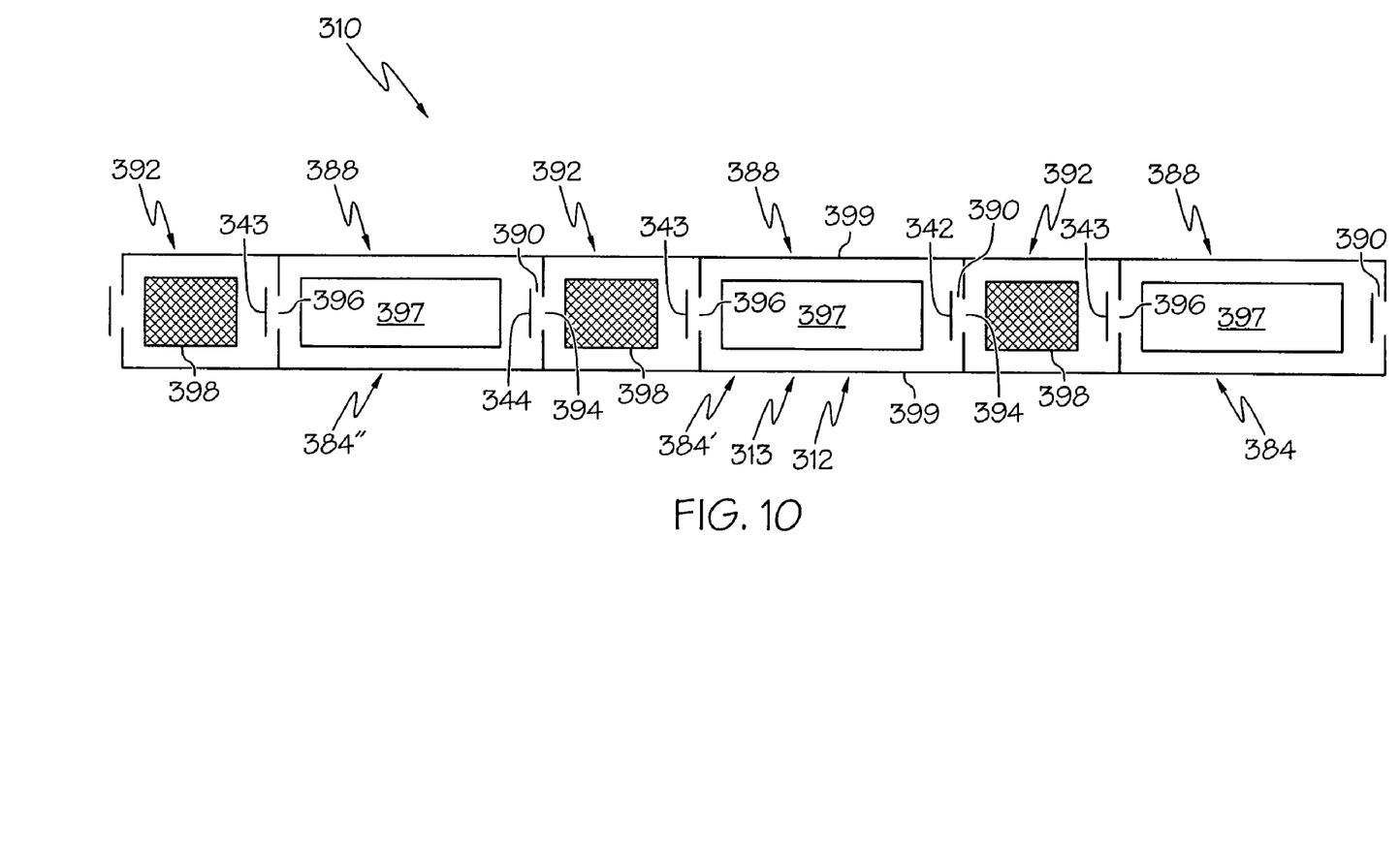
FIG. 10 is a diagrammatic view of three serially-connected pump stages of the tire pump of FIG. 9.

A third embodiment of a tire pump is shown in FIGS. 9-10. A first expression of the embodiment FIGS. 9-10 is for a tire pump 310 which includes including a passive air pump 312 attachable (and in one example attached) to a component of a vehicle wheel assembly 314 having a vehicle wheel 316, a tire valve stem 318 attached to the vehicle wheel 316, and a tire 320 mounted on the vehicle wheel 316 and containing a gas 322. The passive air pump 312 has an air inlet 324 in direct fluid communication with the atmosphere 326 (such as through the tire valve stem in a manner similar to that shown in FIG. 6) and has an air outlet 328 in direct fluid communication with the gas 322 in the tire 320. The passive air pump 312 is operable by transient pressure pulses of the gas 322 in the tire 320 to suck in an air volume from the atmosphere 326 through the air inlet 324 after a present one of the transient pressure pulses and to pump at least some of the sucked-in air volume through the air outlet 328 into the tire 320 during a future one of the transient pressure pulses.

In one employment of the first expression of the embodiment of FIGS. 9-10, the passive air pump 312 is a multi stage passive air pump 313 having N serially connected pump stages 384, and the future one of the transient pressure pulses is an Nth next-in-time one of the transient pressure pluses to the present one of the transient pressure pulses.

Figure 11:
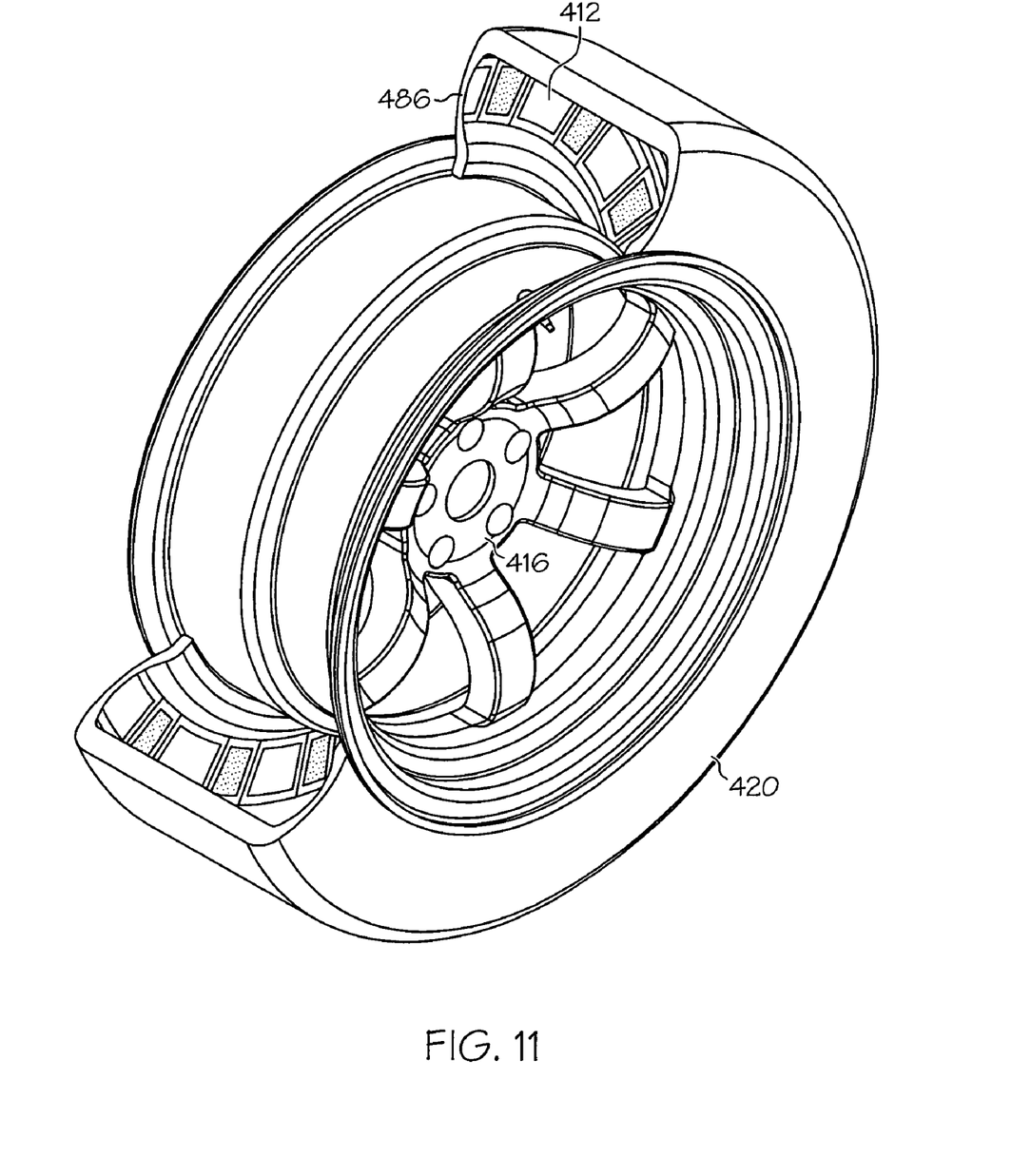
FIG. 11 is a schematic, partially cutaway, perspective view of an embodiment of a vehicle wheel, a tire valve stem, a tire, and an alternate third embodiment of a tire pump attached to the tire sidewall.

In one enablement of the first expression of the embodiment of FIGS. 9-10, the vehicle wheel 316 includes a wheel rim 370, and the passive air pump 312 is an internal passive air pump disposable inside the tire 320 and attachable to the wheel rim 370. In an alternate third embodiment, shown in FIG. 11, the tire 420, which is shown attached to the vehicle wheel 416, includes a tire sidewall 486, and the passive gas pump 412 is an internal passive gas pump disposable inside the tire 420 and attachable to the fire sidewall 486. In one variation of the alternate third embodiment, not shown, the air inlet is in direct fluid communication with the atmosphere through a vent in the tire sidewall.

A second expression of the embodiment of FIGS. 9-10 is for a fire pump 310 comprising a multi-stage passive air pump 313 having N serially connected pump stages 384 and attachable (and in one example attached) to a component of a vehicle wheel assembly 314 having a vehicle wheel 316, a fire valve stem 318 attached to the vehicle wheel 316, and a tire 320 mounted on the vehicle wheel 316 and containing a gas 322. The passive air pump 313 has an air inlet 324 in direct fluid communication with the atmosphere 326 and has an air outlet 328 in direct fluid communication with the gas 322 in the tire 320. The passive air pump 313 is operable by transient pressure pulses of the gas 322 in the tire 320 to suck in an air volume from the atmosphere 326 through the air inlet 324 after a present one of the transient pressure pulses and to pump at least some of the sucked-in air volume through the air outlet 328 into the tire 320 during an Nth next-in-time one of the transient pressure pulses to the present one of the transient pressure pulses. Each pump stage 384 includes a resiliently squeezable section 388 having an air inlet port 390 and squeezable by the transient pressure pulses, an accumulator section 392 having an air outlet port 394, and an air transfer port 396 fluidly connecting the resiliently squeezable section 388 and the accumulator section 392.

In one enablement of the second expression of the embodiment of FIGS. 9-10, the tire pump 310 also includes a check valve 343 disposed between the resiliently squeezable section 388 and the accumulator section 392. In this enablement, the tire pump 310 further includes a check valve 342 disposed between the air inlet port 390 of one pump stage 384' and the air outlet port 394 of the serially preceding adjoining pump stage 384. In this enablement, the tire pump 310 additionally includes a check valve 344 disposed between the air outlet port 394 of the one pump stage 384' and the air inlet port 390 of the serially following adjoining pump stage 384".

In one arrangement of the second expression of the embodiment of FIGS. 9-10, the air inlet port 390 of the serially first pump stage 384 is the air inlet 324 of the passive air pump 313, and the air outlet port 394 of the serially Nth pump stage 384 is the air outlet 328 of the passive air pump 313. In the same or a different arrangement, the resiliently squeezable section 388 contains a squeezable foam 397, and the accumulator section 392 includes a rigid porous material 398. In one variation, the squeezable foam 397 is surrounded by plastic film 399, the rigid porous material 398 is surrounded by plastic film 399, and the check valves 342, 343, and 344 are balloon valves.

In one design of the second expression of the embodiment of FIGS. 9-10, each section 388 and 392 holds substantially 0.5 cubic inch of air, and the pump stages 384 are cascaded from atmospheric air up to 32 psi gage. Pump stages 384 serially nearest the air inlet 324 have less flexible foam 397, and pump stages 384 serially nearest the air outlet 328 have more flexible foam 397. Pump stages 384 serially nearest the air inlet 324 have larger operating volumes, and pump stages 384 serially nearest the air outlet 328 have smaller operating volumes. Over pressure regulation is achieved by foam stiffness. Once crushed by overpressure, the pump stops operating. Lower pressure allows the pump to resume operation. In one variation, the foam is replaced with other resilient material such as, without limitation, metal mesh/spring, etc. In one modification of any of the embodiments of FIGS. 1-11, the tire pump includes a filter (not shown) which allows in air but keeps out liquid and dust, as can be appreciated by the artisan.

Several benefits and advantages are derived from the expression of an embodiment of the invention. The passive air pump remains attached to the component of the vehicle wheel assembly when the vehicle is moving and uses transient pressure pulses of the gas in the tire to operate the passive air pump. In one application, transient pressure pulses occur when the tire experiences rough road bumps and/or when the tire experiences handling maneuvers which cycle the vehicle's suspension. In one example, the passive air pump increases tire pressure to a desired level overcoming the normal tire gas leakage without any action taken by the vehicle operator or service personnel.

The foregoing description of several embodiments of the invention has been presented for purposes of illustration. It is not intended to be exhaustive or to limit the invention to the precise procedures or precise forms disclosed, and obviously many modifications and variations are possible in light of the above teaching. It is intended that the scope of the invention be defined by the claims appended hereto.

The invention claimed is:

1. A tire pump comprising a single-stage passive air pump attachable to a tire valve stem which is devoid of a tire valve and which is attached to a vehicle wheel supporting a tire containing a gas, wherein the passive air pump has an air inlet in direct fluid communication with the atmosphere and has an air outlet in direct fluid communication with the gas in the tire, wherein the passive air pump is operable by transient pressure pulses of the gas in the tire to suck in an air volume from the atmosphere through the air inlet after a present one of the transient pressure pulses and to pump at least some of the sucked-in air volume through the air outlet into the tire during a next-in-time one of the transient pressure pulses to the present one of the transient pressure pulses, and wherein the passive air pump includes first and second check valves and includes a piston assembly having a piston and having a piston rod attached to the piston with the piston rod having a free end, wherein the passive air pump includes a gas path containing air and fluidly connecting together the air inlet and the air outlet, wherein the first check valve is disposed in the gas path toward the air inlet, wherein the second check valve is disposed in the gas path toward the air outlet, wherein the free end of the piston rod is movable to compress and suction the air in the gas path between the first and second check valves, and wherein the piston is in direct fluid communication with the gas in the tire.

2. The tire pump of claim 1, wherein the passive air pump also includes a tire valve having a tire-filling inlet in direct fluid communication with the atmosphere and having a tire-filling outlet in direct fluid communication with the gas in the tire.

\* \* \* \* \*